United States Patent
Mochizuki et al.

(10) Patent No.: US 7,818,469 B2
(45) Date of Patent: Oct. 19, 2010

(54) USB DEVICE AND PERIPHERAL DEVICE CHANGING FUNCTIONAL MODULE TO ACTIVATE IN ACCORDANCE WITH DESCRIPTOR

(75) Inventors: Yoshinori Mochizuki, Yokohama (JP); Masaharu Ukeda, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 47 days.

(21) Appl. No.: 11/954,129

(22) Filed: Dec. 11, 2007

(65) Prior Publication Data

US 2008/0155143 A1 Jun. 26, 2008

(30) Foreign Application Priority Data

Dec. 12, 2006 (JP) .............................. 2006-333921

(51) Int. Cl.
- G06F 3/00 (2006.01)
- G06F 9/00 (2006.01)
- G06F 9/24 (2006.01)
- G06F 15/177 (2006.01)
- G06F 1/24 (2006.01)
- G06F 11/00 (2006.01)
- H04M 1/24 (2006.01)
- H04M 15/00 (2006.01)

(52) U.S. Cl. .................. 710/15; 379/32.01; 379/112.04; 713/1; 713/2; 713/100; 714/47; 710/16

(58) Field of Classification Search .................. 710/15, 710/16; 379/32.01, 112.04; 713/1, 2, 100; 714/47

See application file for complete search history.

(56) References Cited

U.S. PATENT DOCUMENTS 7,293,187 B2 11/2007 Ono et al.
2005/0050371 A1* 3/2005 Ono ........................... 713/300

FOREIGN PATENT DOCUMENTS

| JP | 2004-86359 | 3/2004 |
| JP | 2004-341699 | 12/2004 |
| JP | 2005-71274 | 3/2005 |

OTHER PUBLICATIONS

Universal Serial Bus Specification, Revision 2.0, Apr. 27, 2000, Compaq, Hewlett-Packard, Intel, Lucent, Microsoft, NEC, Philips.*

* cited by examiner

*Primary Examiner*—Alford W Kindred
*Assistant Examiner*—Farley J Abad
(74) *Attorney, Agent, or Firm*—Mattingly & Malur, P.C.

(57) ABSTRACT

In a USB device comprising a plurality of functional modules that includes a control circuit for switching a functional module to be activated from among the functional modules included in the USB device according to a potential level of a power applied from a host connected to the USB device. The control circuit includes: a voltage detector for discriminating a voltage value of power; a switch for controlling powers to be applied to the respective functional modules; and memories for storing descriptors relating to the USB device. The control circuit makes power applied to a functional module to be activated by the switch into ON state according to a discrimination result of the voltage value of the power by the voltage detector, thereby transferring the descriptors stored in the memories to a host.

6 Claims, 10 Drawing Sheets

USB DEVICE AND PERIPHERAL DEVICE CHANGING FUNCTIONAL MODULE TO ACTIVATE IN ACCORDANCE WITH DESCRIPTOR

CROSS-REFERENCE TO RELATED APPLICATION

The present application claims priority from Japanese Patent Application serial No. JP 2006-333921 filed on Dec. 12, 2006, the content of which is hereby incorporated by reference into this application.

TECHNICAL FIELD OF THE INVENTION

The present invention relates to a technique of a USB (Universal Serial Bus) device and a peripheral device for a computer. More particularly, the present invention relates to a technique effectively applied to a method of selecting a module to apply a voltage in a USB device at a time of start.

BACKGROUND OF THE INVENTION

For example, as for a technique of a USB device, there is a USB interface as a communication interface between a personal computer and a peripheral device thereof. There are a keyboard, a USB memory, and the like as a USB-compliant peripheral device. These devices generally do not have a power supply inside and are supplied with power by such a host as a personal computer. In the case of devices having only some specific function like a keyboard, since power consumption required for internal operation thereof is small, there is no problem in using such a device to PDAs or mobile phones which have a battery of small capacity.

As to a USB device having many functions, however, since power consumption required for its operation becomes large, it is difficult to use such a device for PDAs or mobile phones from the aspect of capacity of battery.

Consequently, as a technique for reducing power consumption required for operation, there is described a technique of shutting off power supply to an unnecessary block during connection to a USB by a switch in U.S. Patent Application Publication No. 2005/0050371 (corresponding to Japanese Patent Application Laid-Open Publication No. 2005-71274). In Japanese Patent Application Laid-Open Publication No. 2004-341699, there is described a technique of causing a user to select a usage function when a host rejects connection with a high power device to change settings so as to make it a low power device. In Japanese Patent Application Laid-Open Publication No. 2004-86359, there is described a technique of determining an operation mode and power consumption of a device according to negotiation between a host and a device at a start time.

SUMMARY OF THE INVENTION

Meanwhile, when a multifunctional USB device is used to a PDA or a mobile phone, only some specific functions may be used unlike a personal computer using all functions.

Accordingly, the present invention focuses attention on that there is a case where only some specific functions are used, and it adopts a method of limiting a usable function according to a host and supplying no power to a module for performing a function to be unused. And, an object of the present invention is to provide a USB device and a peripheral device for computer which are capable of reducing power consumption according to a host.

The above and other objects and novel characteristics of the present invention will be apparent from the description of this specification and the accompanying drawings.

The typical ones of the inventions disclosed in this application will be briefly described as follows.

According to the present invention, it is possible to determine whether power is supplied to all modules or only some certain modules by using a voltage value or data which is supplied from a host. In this manner, although usable functions are limited, it becomes possible to reduce power consumption of a USB device according to a host.

The effects obtained by typical aspects of the present invention will be briefly described as follows.

According to the present invention, a USB device and a peripheral device for a computer which are capable of reducing power consumption according to a host can be provided.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

A first embodiment of the present invention will be described in detail with reference to FIG. 1 to FIG. 3.

Figure 1:
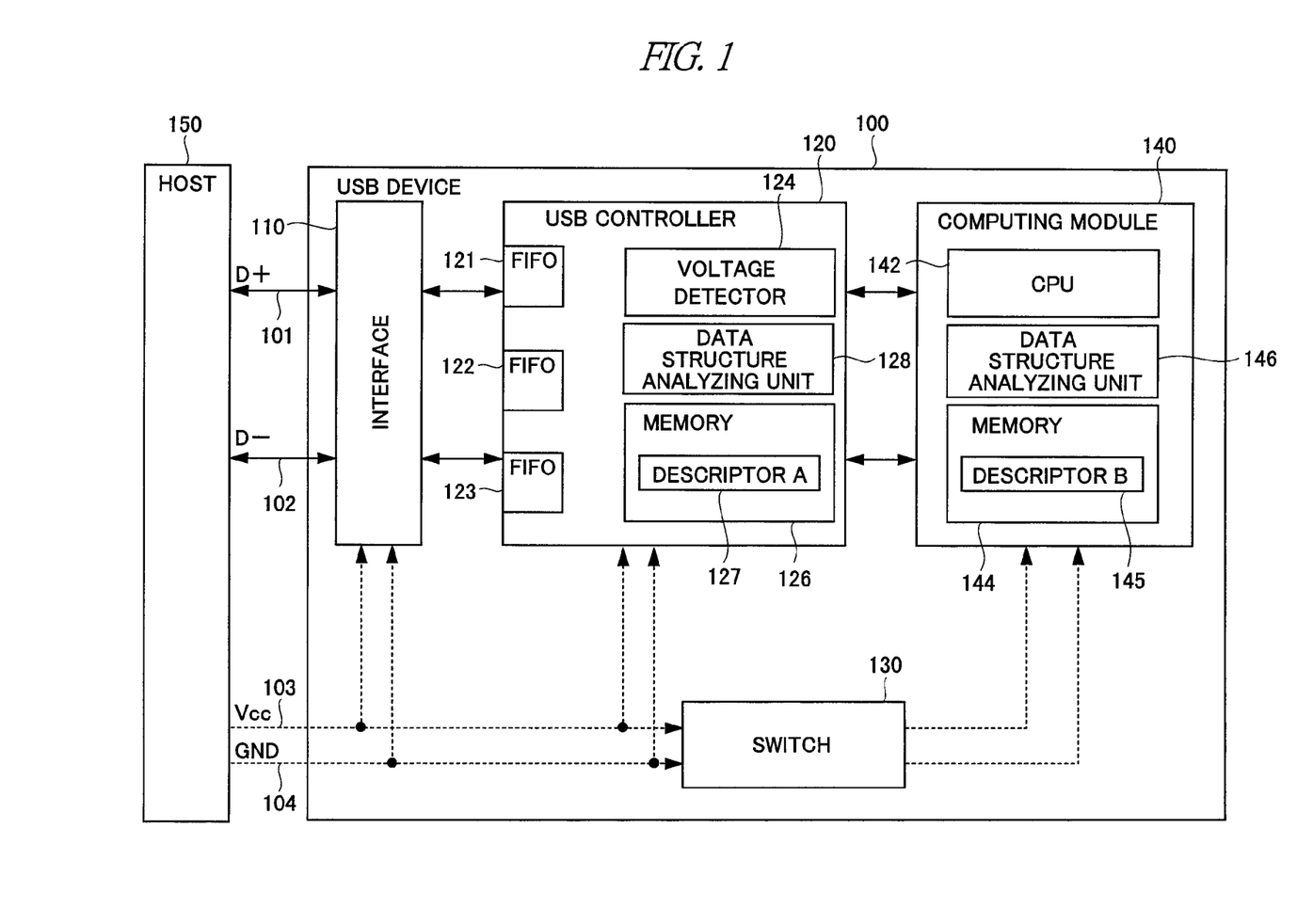
FIG. 1 is a diagram showing a USB device according to a first embodiment of the present invention and connection between the USB device and a host.

FIG. 1 is a diagram showing a USB device according to the first embodiment of the present invention and connection between the USB device and a host.

A USB device 100 of the first embodiment is a device including: an interface 110; a USB controller 120; a switch 130; and a computing module 140. The USB device 100 is connected with a host 150 via two signal lines (D+ line 101, D− line 102) and two power lines (Vcc line 103, GND line 104). Data is transferred by a differential signal using the D+ line 101 and the D− line 102. Data is transmitted in such a system where the D+ line 101 and the D− line 102 are inverted respectively when data to be transmitted is "0" and they are not inverted when the data is "1".

The interface 110 is a module for digitalizing data transferred from the host 150 or converting data to be transferred to the host 150 from the USB device 100 into analog data.

The USB controller 120 is a module including: FIFOs 121 to 123 called "end points"; a voltage detector 124; a memory 126; and a data structure analyzing unit 128. When data transmission and reception are performed between the host 150 and the USB device 100, these are performed via the end points. The voltage detector 124 is a module for discriminating a voltage value of the Vcc line 103. The memory 126 can store a descriptor A 127 in addition to data transmitted from the host 150. The descriptor means information showing the type and characteristic of the USB device 100. In terms of type of the USB device 100, there are a memory, a keyboard, a mouse, and the like. In terms of characteristic of the USB device 100, there are a data-transfer method and the like. The host 150 obtaining the descriptor at a start time, thereby obtaining such information about the USB device 100 such as what format of data should be transmitted to which end point according to use application of the USB device 100. The data structure analyzing unit 128 performs processings such as confirmation of whether or not the format of data transmitted from the host 150 has a structure suitable for the descriptor A 127 and conversion of the data format to be transmitted to the host 150 into a data format suitable for the descriptor A 127.

The switch 130 is a module for controlling the Vcc line 103 and the GND line 104 connected to the computing module 140. At a start time of the USB device 100, the switch 130 is put into OFF state to prevent applying a voltage to the computing module 140.

The computing module 140 is a module including a CPU 142, a memory 144, and a data structure analyzing unit 146. The CPU 142 is a module for performing a processing of data which is transmitted and received between the USB device 100 and the host 150. The memory 144 can store a descriptor B 145 in addition to data transmitted from the host 150 similarly to the case of the memory 126. The data structure analyzing unit 146 performs a processing of confirming whether or not the format of data transmitted from the host 150 has a structure suitable for the descriptor B 145, a processing of converting the data format to be transmitted to the host 150 into a data format suitable for the descriptor B 145, and the like. The function of the data structure analyzing unit 146 may be added to the function of the data structure analyzing unit 128 in the USB controller 120.

In the USB device 100 thus configured, the voltage detector 124 functions as discriminating means for discriminating a voltage value of the power supply, the switch 130 functions as controlling means for controlling power applied to the respective functional modules, the memory 126 and the memory 144 function as memorizing means for storing a descriptor relating to the USB device 100. And the respective functional modules configures a control circuit for switching a functional module to be activated from among the functional modules included in the USB device 100 according to a potential level of power supplied from the host 150 connected to the USB device 100.

Figure 2:
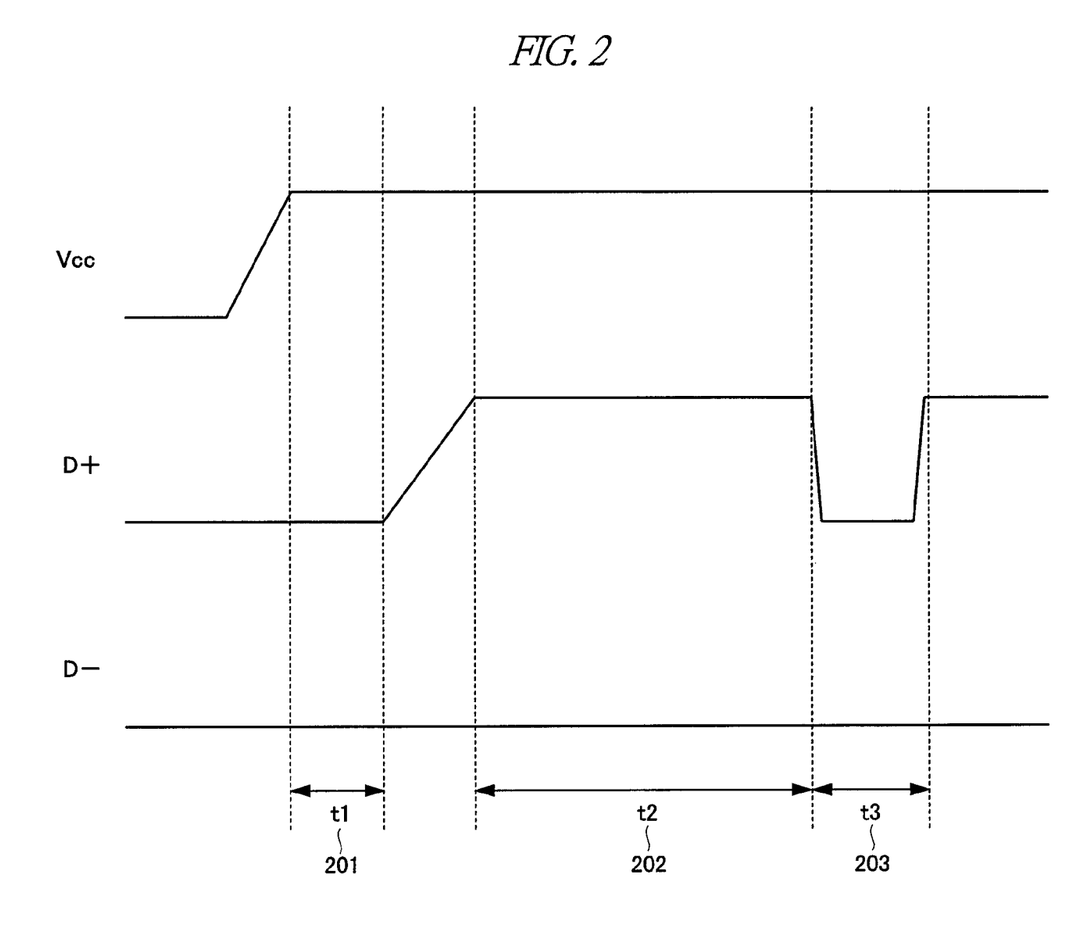
FIG. 2 is a diagram showing operation timings of a power line and a data line at a start time of the USB device according to the first embodiment of the present invention.

With reference to FIG. 2, operations of the Vcc line 103, the D+ line 101, and the D− line 102 at a start time of the USB device 100 will be described. FIG. 2 is a diagram showing operation timings of the power line and data lines at a start time of the USB device 100.

At a start time of the USB device 100, a voltage is applied to the Vcc line 103, and after a value of the voltage becomes stable and t1 elapses, the host 150 makes High either the D+ line 101 or the D− line 102 (the D+ line 101 is High in FIG. 2) (201). After the terminal made to be High becomes stable and t2 elapses, the host 150 makes the terminal made to be High to Low (202). Besides, after t3 elapses, the host 150 makes the terminal made to be Low to High again (203). This operation is called "reset". After reset termination, the USB device 100 transfers a descriptor to the host 150. The above is operations of the respective lines observed at the start time of the USB device 100.

Figure 3:
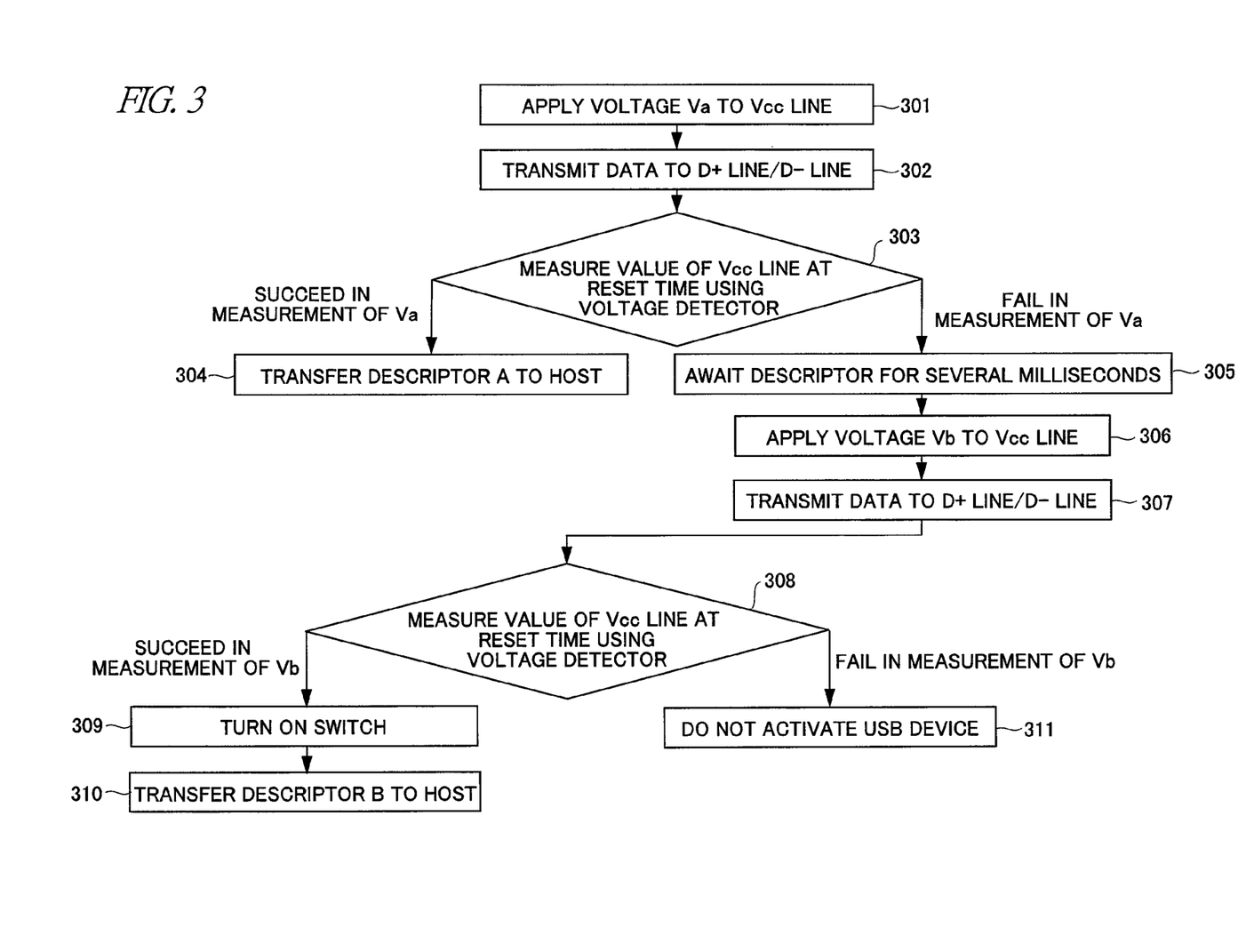
FIG. 3 is a diagram showing an operation flow at the start time of the USB device according to the first embodiment of the present invention.

With reference to FIG. 3, a flow from the application of a voltage from the host 150 to the Vcc line 103 to the transfer of a descriptor stored in the memory 126 or the memory 144 from the USB device 100 to the host 150 will be described. FIG. 3 is a diagram showing an operation flow at the start time of the USB device 100.

First, a case in which the host 150 causes the USB device 100 to operate with low power consumption by using the descriptor A 127 stored in the memory 126 will be described.

The host 150 applies a voltage Va to the Vcc line 103 for start of the USB device 100 (301). After the voltage becomes stable, the host 150 transmits data to the D+ line 101 and the D− line 102, as described in FIG. 2 (302). The USB controller 120 uses the voltage detector 124 to measure a voltage value of the Vcc line 103 at the reset time (303).

As a result of the measurement, when the voltage detector 124 succeeds in measuring a voltage value Va, the switch 130 is not turned ON so that only a certain function of the USB device 100 can be used (the interface 110 and the USB controller 120 are usable and the computing module 140 is unusable in FIG. 1), and the descriptor A 127 stored in the memory 126 is transferred to the host 150 (304). On the other hand, when the voltage detector 124 fails in measuring the voltage value Va, the host 150 waits for several milliseconds until a descriptor is set to the FIFO at the end point 0 (305).

After the several milliseconds elapse, a voltage Vb is applied to the Vcc line 103 (306). After the voltage becomes stable, the host 150 transmits such data as described in FIG. 2 again (307). The USB controller 120 measures a voltage value on the Vcc line 103 at a reset time by using the voltage detector 124 (308).

As a result of the measurement, when the voltage detector 124 succeeds in measuring a voltage value Vb, the USB controller 120 turns ON the switch 130 so that all functions of the USB device 100 can be used (the interface 110, the USB controller 120, and the computing module 140 are usable in FIG. 1), and applies a voltage to the computing module 140 (309). The computing module 140 applied with a voltage transfers the descriptor B 145 stored in the memory 144 to the host 150 (310). Note that, the USB controller 120 may transfer the descriptor B 145 stored in the memory 144 to the host 150. In this case, the USB controller 120 is required to preliminarily know an address of the memory 144 where the descriptor B 145 is stored. On the other hand, when the voltage detector 124 fails in measuring the voltage value Vb, the USB device 100 does not operate (311).

Note that, a voltage value measured by the voltage detector 124 is a stable voltage value like the value on the Vcc line 103 at the reset time.

Next, a flow in a case where the host 150 should not cause the USB device 100 to operate with low power consumption is the same as the above flow of steps 306 to 310, and the description thereof will be omitted.

The foregoing is the flow from application of a voltage to the Vcc line 103 to transfer of a descriptor to the host 150 from the USB device 100.

Therefore, according to the first embodiment, since the USB device 100 includes the voltage detector 124, the switch 130, the memory 126, the memory 144 and the like, the computing module 140 does not operate when the voltage applied to the USB device 100 is Va and thus power consumption of the USB device 100 can be reduced though functions are limited. Further, a conventional system of switching between functions of the USB device 100 according to a voltage value cannot perform changing the type of the USB device 100 such as changing from a USB memory to a USB token, but since a plurality of descriptors and the data structure analyzing unit are included, it is made possible to change the type itself of the USB device 100. General USB devices are operated at 5V. Therefore, it is preferable to set Va at a range of 3V to 4V and set Vb at 5V. It is necessary for the host 150 to be preliminarily installed with a device driver to cause a voltage to operate in the manner shown in FIG. 3.

Second Embodiment

In the first embodiment, selection of a switch is performed based on the value of the Vcc line. Meanwhile, in a second embodiment, an example of selecting an operation of a switch based on operations of the signal lines (D+ line, D− line) will be described.

The second embodiment of the present invention will be described in detail with reference to FIG. 4 to FIG. 6.

Figure 4:
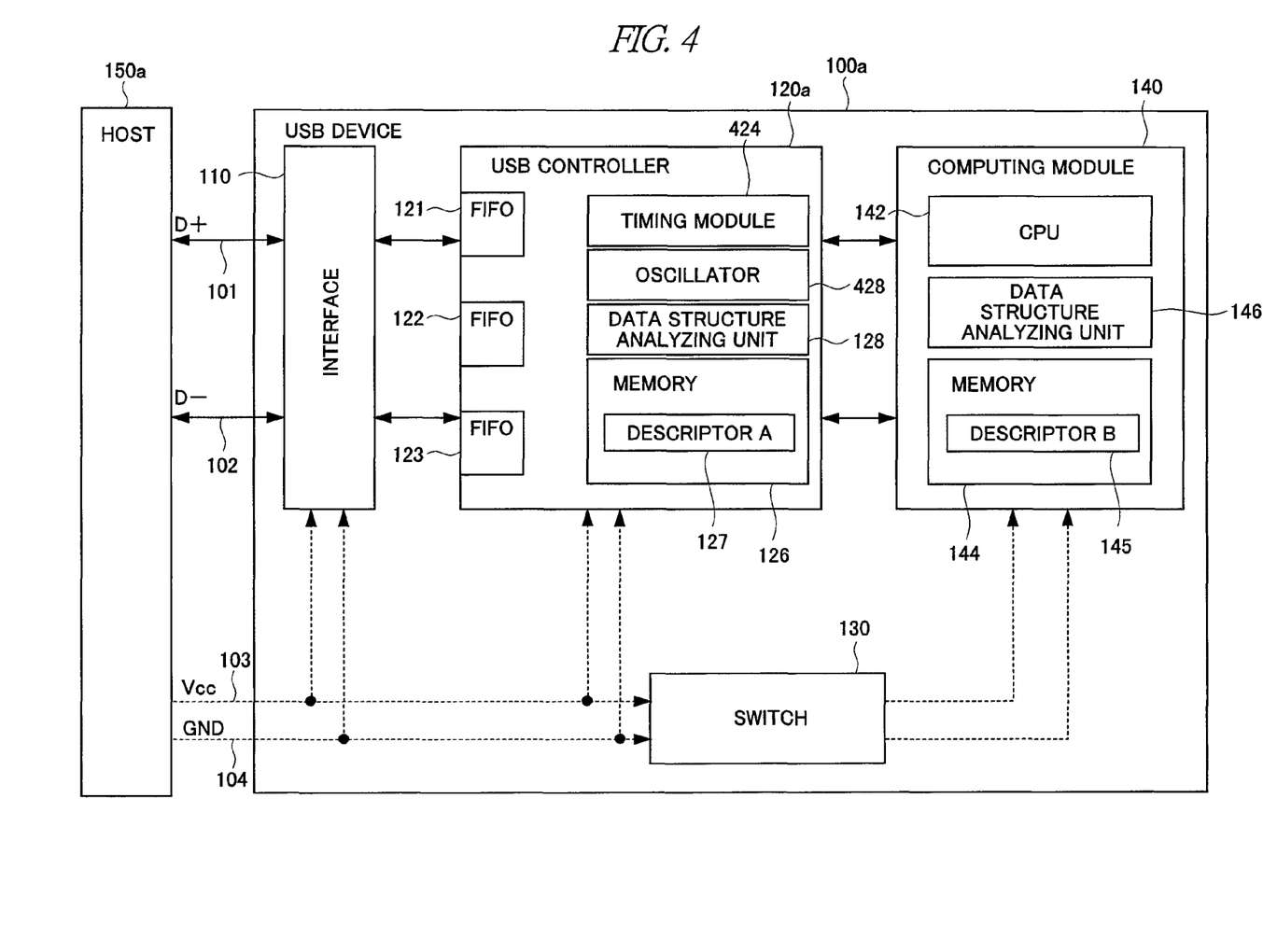
FIG. 4 is a diagram showing a USB device according to a second embodiment of the present invention and connection between the USB device and a host.

FIG. 4 is a diagram showing a USB device according to the second embodiment of the present invention and connection between the USB device and a host.

In a USB device 100a of the present embodiment, a difference from the USB device 100 shown in FIG. 1 lies in that, in a USB controller 120a, a timing module 424 and an oscillator 428 are added in place of the voltage detector. The timing module 424 is a module for performing timing based on a clock. The clock used at this time is generated in the oscillator 428. It makes no difference if the oscillator 428 is placed inside or outside the USB controller 120a, as long as the oscillator 428 operates in a state where the switch 130 is turned OFF.

In the USB device 100a thus configured, the timing module 424 functions as measuring means for measuring a reset time of a data line, the switch 130 functions as controlling means for controlling power applied into the respective functional modules, the memory 126 and the memory 144 function as memorizing means for storing a descriptor relating to the USB device 100a, the oscillator 428 functions as oscillating means for generating clocks used for measuring a reset time, and a control circuit is configured by these functional modules.

Figure 5:
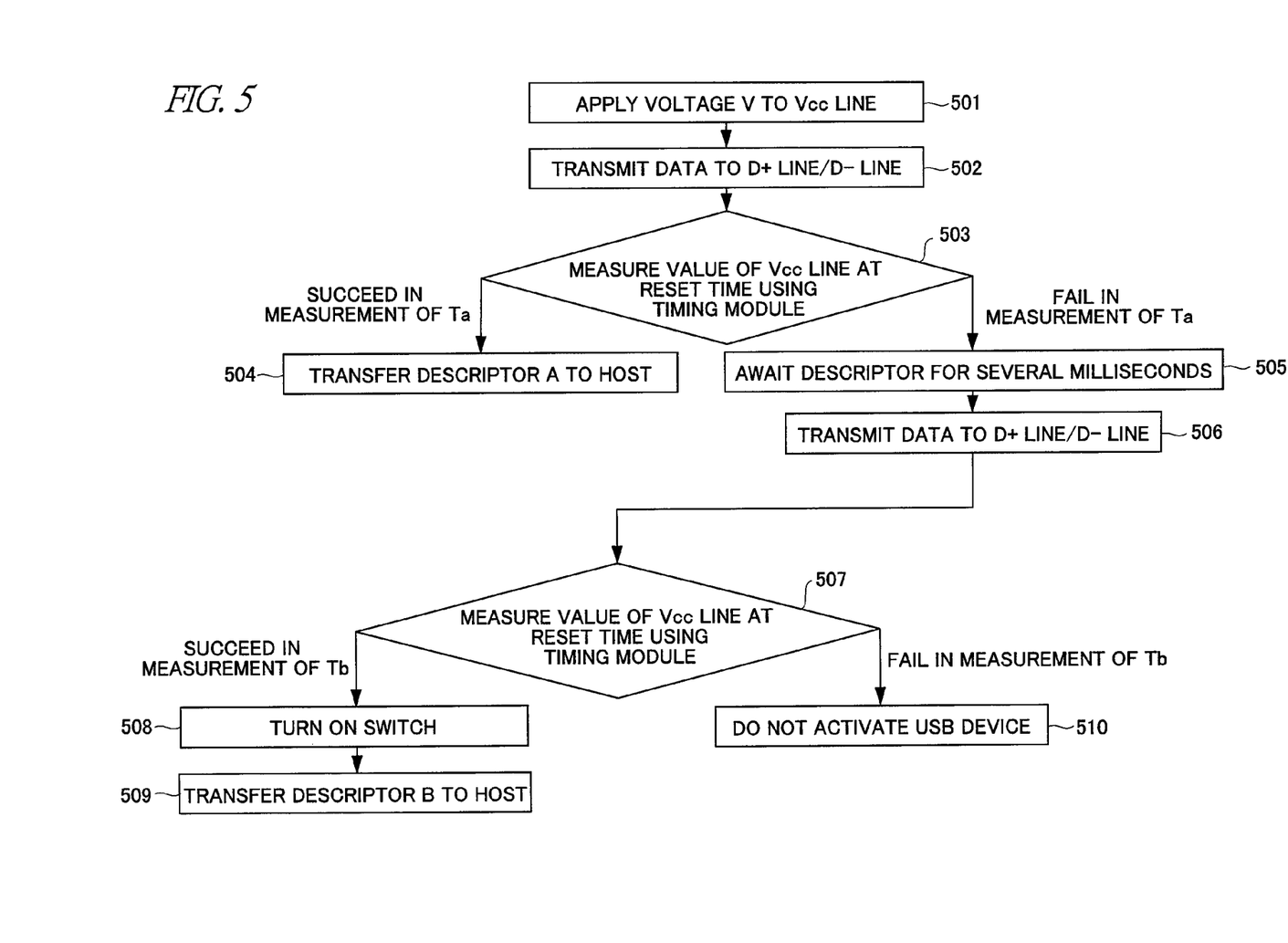
FIG. 5 is a diagram showing an operation flow at a start time of the USB device according to the second embodiment of the present invention.

With reference to FIG. 5, a flow from application of a voltage from the host 150a to the Vcc line 103 to transmission of a descriptor stored in the memory 126 or the memory 144 from the USB device 100a to the host 150a will be described.

First, a case in which the host 150a causes the USB device 100a to operate with low power consumption by using the descriptor A 127 stored in the memory 126 will be described.

The host 150a applies a voltage to the Vcc line 103 for starting the USB device 100a (501). After the voltage becomes stable, the host 150a transmits data to the D+ line 101 and the D− line 102, as described in FIG. 2 (502). In this case, the data is data where a time at a reset time satisfies Ta. The time at a reset time indicates a Reset period (601) shown in FIG. 6. The USB controller 120a measures a time at a reset time by using the timing module 424 and the oscillator 428 (503).

As a result of the measurement, when the timing module 424 succeeds in measuring the reset time Ta, the switch 130 is not turned ON so that only some certain functions in the USB device 100a can be used, and the descriptor A 127 stored in the memory 126 is transferred to the host 150a (504). On the other hand, when the timing module 424 fails in measuring the reset time Ta, after waiting for several milliseconds until the descriptor is transferred (505), the host 150a transmits such data that the time at the reset time satisfies Tb to the D+ line 101 and the D− line 102 (506). The USB controller 120a measures a time of reset by using the timing module 424 and the oscillator 428 (507).

As a result of the measurement, when the timing module 424 succeeds in measuring Tb, the USB controller 120a turns ON the switch 130 so that all functions in the USB device 100a can be used, and a voltage is applied to the computing module 140 (508). The computing module 140 applied with a voltage transmits the descriptor B 145 stored in the memory 144 to the host 150a (509). Note that, the USB controller 120a may transmit the descriptor B 145 stored in the memory 144 to the host 150a. In this case, the USB controller 120a is required to preliminarily know an address of the memory 144 where the descriptor B 145 is stored. On the other hand, when the timing module 424 fails in measuring Tb, the USB device 100a does not operate (510).

Figure 6:
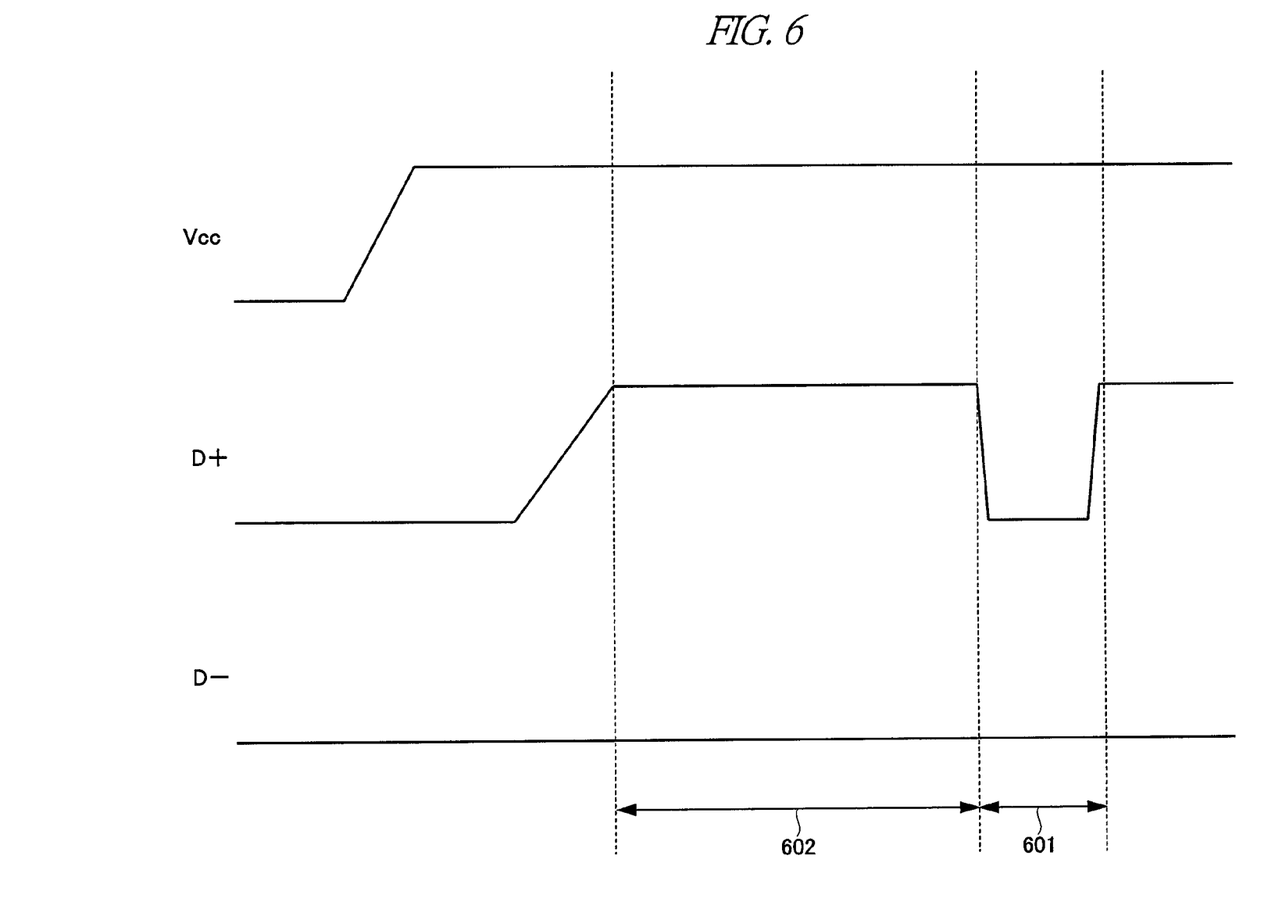
FIG. 6 is a diagram showing operation timings of a power line and a data line at a start time of the USB device according to the second embodiment of the present invention.

Note that, a time measured by the timing module 424 may be a time elapsing from stabilization of the signal line which has been made High to reset in addition to the time at the Reset period (period 602 shown in FIG. 6).

The foregoing is the flow from application of a voltage to the Vcc line 103 to transfer of a descriptor to the host 150a from the USB device 100a.

Therefore, according to the present embodiment, since the USB device 100a includes the timing module 424, the oscillator 428, the switch 130, the memory 126, the memory 144 and the like, the computing module 140 does not operate when the time at the Reset period is Ta and thus power consumption of the USB device 100a can be reduced though functions are limited. In this case, the host 150a is required to be preliminarily installed with a device driver to operate in the time period of the Reset period in the manner shown in FIG. 6.

Third Embodiment

In the first embodiment, selection of a switch is performed based on the value of the Vcc line. Meanwhile, in a third embodiment, an example of performing selection of a switch based on an external switch which can be set by a user will be shown.

The third embodiment of the present invention will be described in detail with reference to FIG. 7 and FIG. 8.

Figure 7:
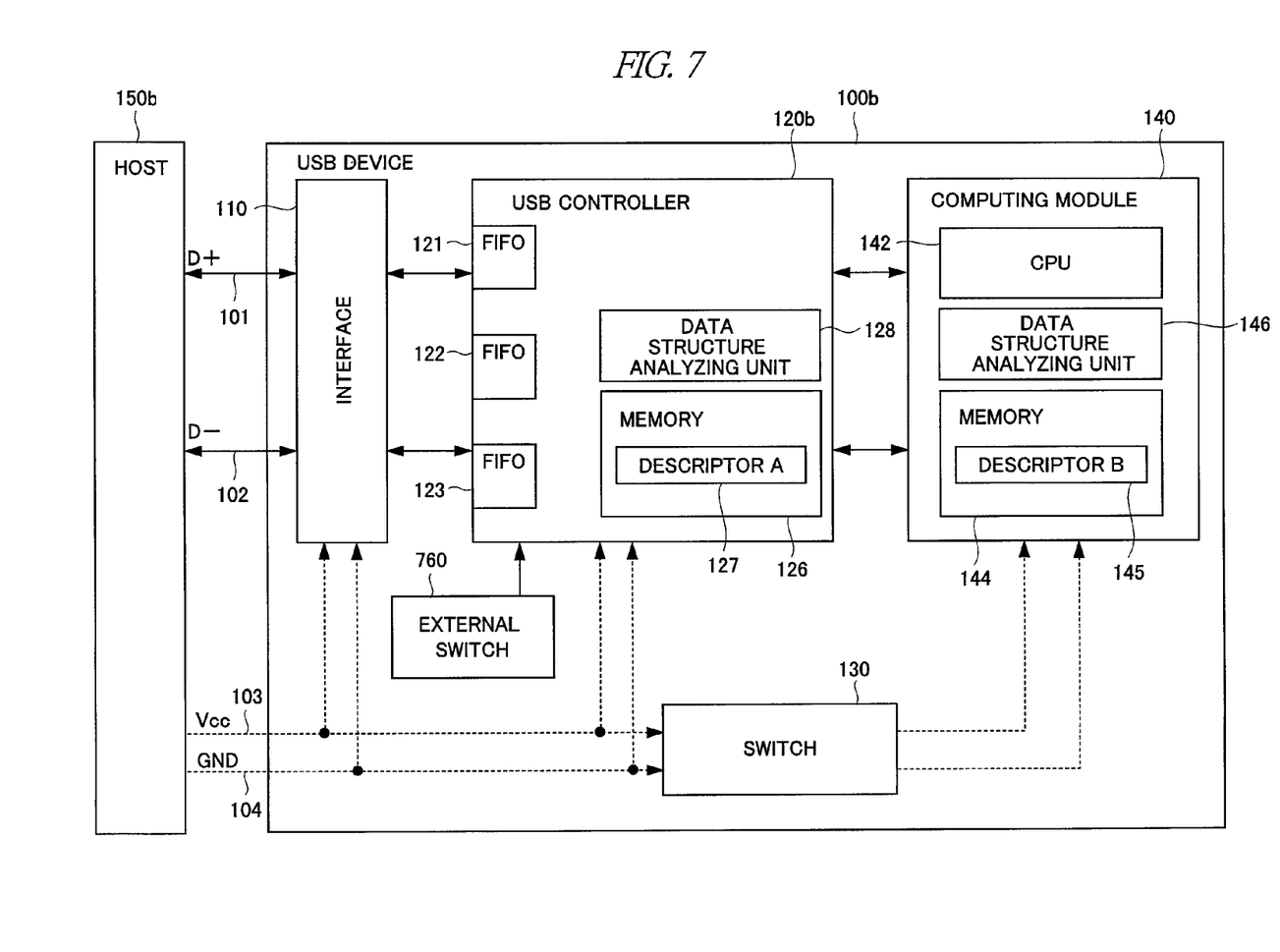
FIG. 7 is a diagram showing a USB device according to a third embodiment of the present invention and connection between the USB device and a host.

FIG. 7 is a diagram showing a USB device according to the third embodiment of the present invention and connection between the USB device and a host.

In a USB device 100b of the third embodiment, a difference from the USB device 100 shown in FIG. 1 lies in that an external switch 760 is added in place of a voltage detector of a USB controller 120b. The external switch 760 is a switch capable of being switched arbitrarily by a user who uses the USB device 100b.

In the USB device 100b thus configured, a USB controller 120b functions as discriminating means for discriminating a state of the external switch 760, the switch 130 functions as controlling means for controlling power applied into the respective functional modules, the memory 126 and the memory 144 function as memorizing means for storing a descriptor relating to the USB device 1b, and a control circuit is configured by these functional modules.

Figure 8:
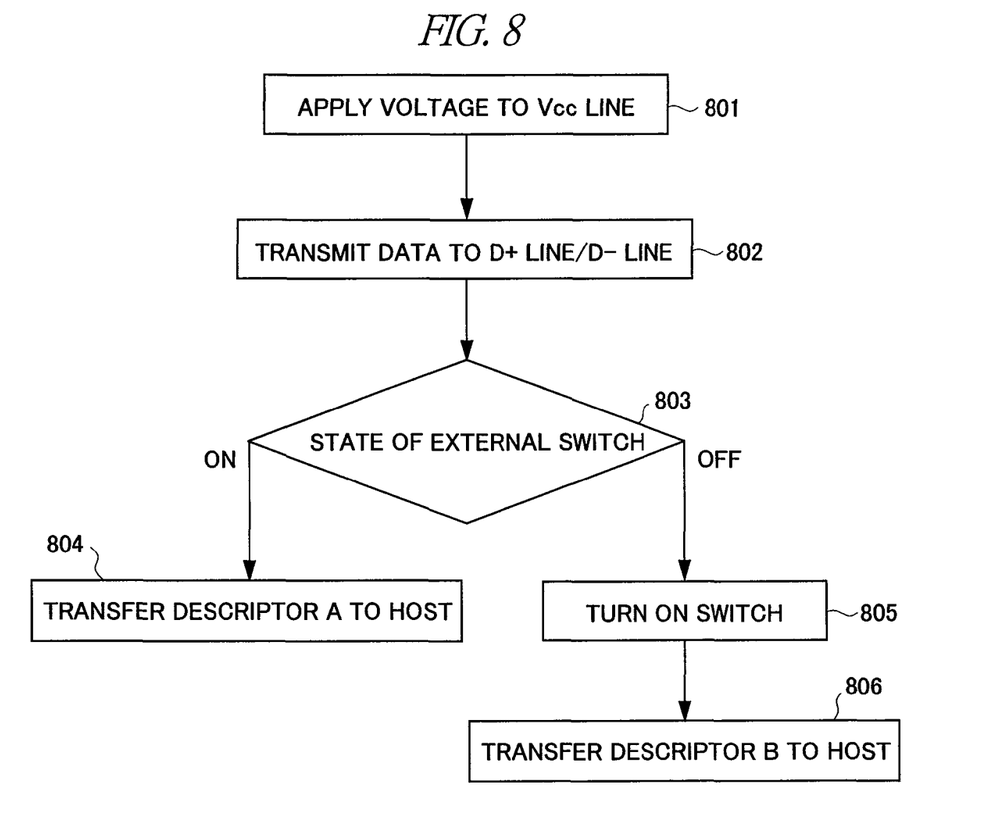
FIG. 8 is a diagram showing an operation flow at a start time of the USB device according to the third embodiment of the present invention.

With reference to FIG. 8, a flow from application of a voltage to the Vcc line 103 to transfer of a descriptor stored in the memory 126 or the memory 144 from the USB device 100b to the host 150b will be described.

A host 150b applies a voltage to the Vcc line 103 for starting the USB device 100b (801). After the voltage becomes stable, the host 150b transmits data to the D+ line 101 and the D− line 102, as described in FIG. 2 (802). The USB controller 120b determines a state of the external switch 760 and selects an operation of the switch 130 based on the determination (803).

If the external switch 760 is OFF, the USB controller 120b does not turn ON the switch 130 so that only some certain functions in the USB device 100b can be used, and the USB controller 120b transmits the descriptor A 127 stored in the memory 126 to the host 150b (804). If the external switch 760 is ON, the USB controller 120b turns ON the switch 130 so that all functions in the USB device 100b can be used, and the USB controller 120b applies a voltage to the computing module 140 (805). The computing module 140 applied with a voltage transfers the descriptor B 145 stored in the memory 144 to the host 150b (806). Note that, the USB controller 120b may transfer the descriptor B 145 stored in the memory 144 to the host 150b. In this case, the USB controller 120b is required to preliminarily know an address of the memory 144 where the descriptor B 145 is stored.

The foregoing is the flow from application of a voltage to the Vcc line 103 to transfer of a descriptor to the host 150b from the USB device 100b.

Therefore, according to the present embodiment, the USB device 100b includes the external switch 760, the switch 130, the memory 126, the memory 144 and the like so that selection of an operation of the switch 130 is performed by the external switch 760, and so the host 150b is not required to install a device driver.

Fourth Embodiment

In the third embodiment, selection of a switch is performed based on a state of the external switch. Meanwhile, in a fourth embodiment, an example of performing selection of a switch based on a signal of a selection line from a host will be described.

The fourth embodiment of the present invention will be described in detail with reference to FIG. 9 and FIG. 10.

Figure 9:
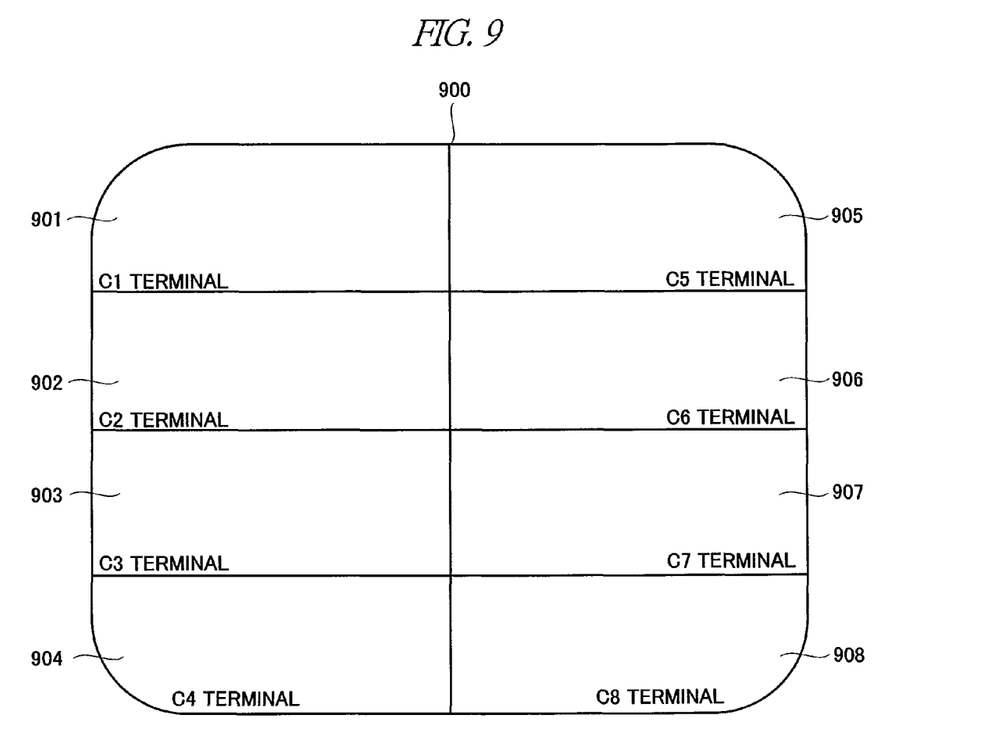
FIG. 9 is diagram showing a PIN arrangement of an IC card according to a fourth embodiment of the present invention.

For example, in a case of a USB device having such a PIN arrangement 900 of an IC card as shown in FIG. 9, a C1 terminal 901 is allocated to a Vpp line, a C4 terminal 904 is allocated to the D+ line, a C5 terminal 905 is allocated to a GND line, a C8 terminal 908 is allocated to the D− line, the remaining unused terminals (C2 terminal 902, C3 terminal 903, C6 terminal 906, C7 terminal 907) can be used like the external switch in FIG. 7.

Figure 10:
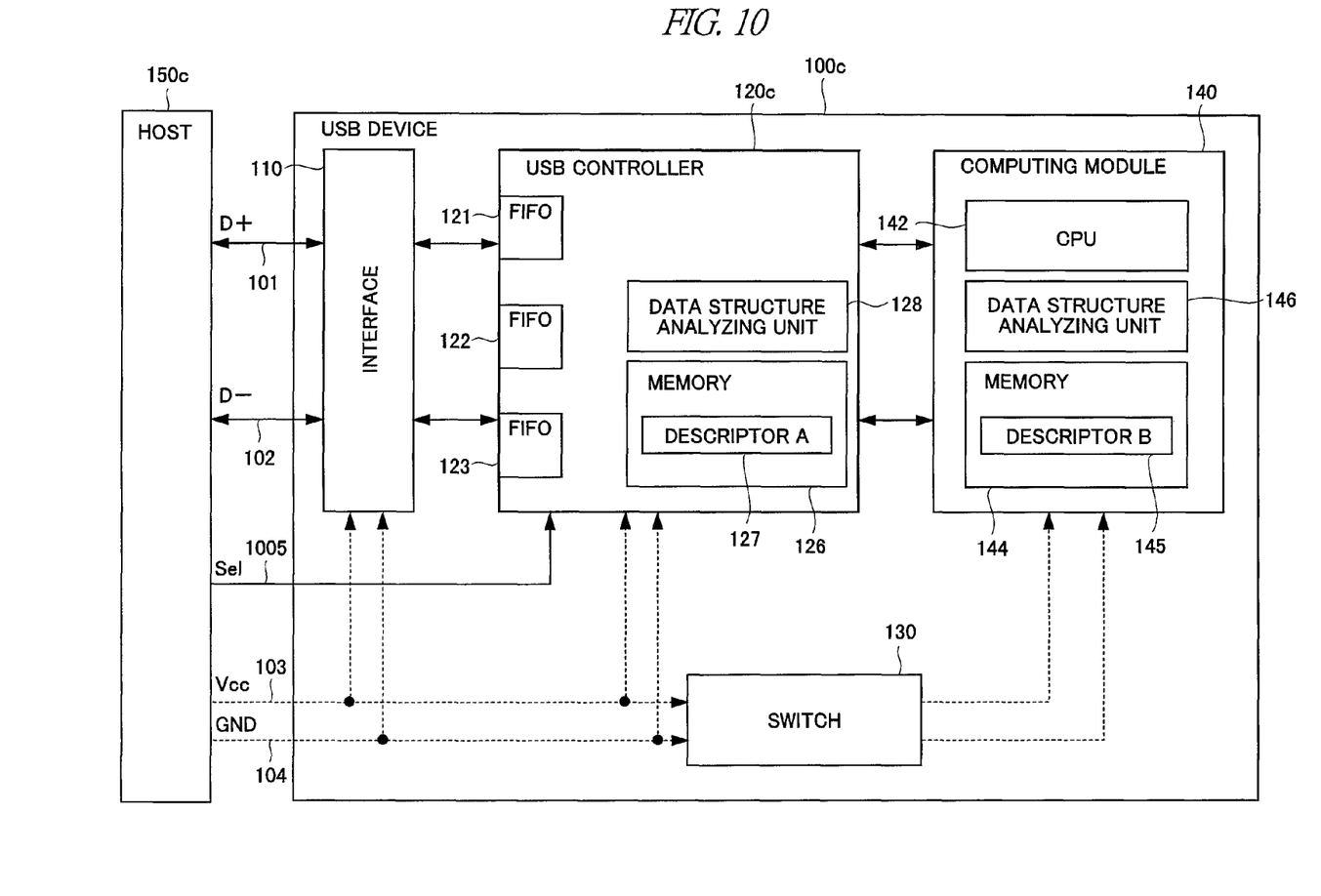
FIG. 10 is a diagram showing a USB device according to the fourth embodiment of the present invention and connection between the USB device and a host.

FIG. 10 is a diagram showing a USB device according to the fourth embodiment of the present invention and connection between the USB device and a host.

In a USB device 100c of the fourth embodiment, the C6 terminal 906 which is an unused terminal is used as a selection line for a Sel line 1005.

In the USB device 100c thus configured, a USB controller 120c functions as discriminating means for discriminating a state of the Sel line 1005, the switch 130 functions as controlling means for controlling power applied into the respective functional modules, the memory 126 and the memory 144 function as memorizing means for storing a descriptor relating to the USB device 100c, and a control circuit is configured by these functional modules.

According to such a configuration as described above, when the Sel line 1005 is OFF, the USB controller 120c does not turn ON the switch 130 so that only some certain functions in the USB device 100c can be used, and the USB controller 120c transfers the descriptor A 127 stored in the memory 126 to the host 150c. When the Sel line 1005 is ON, the USB controller 120c turns ON the switch 130 so that all functions in the USB device 100c can be used, and the computing module 140 applied with a voltage transfers the descriptor B 145 stored in the memory 144 to the host 150c.

Therefore, according to the present embodiment, since the Sel line 1005 is used, an operation of the switch 130 can be selected as in the case of the external switch. In such a configuration diagram as shown in FIG. 10, however, the host 150c is required to install a device driver.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a technique of a USB device and a peripheral device for a computer. More specifically, the present invention is applicable to a technique of selecting a module to which a voltage applied in a USB device at a start time in such a case where a multifunctional USB device is used with a PDA or a mobile phone.

What is claimed is:

1. A Universal Serial Bus (USB) device comprising a plurality of functional modules that includes a control circuit for switching a functional module to be activated from among the functional modules comprised in the USB device according to a potential level of a power supplied from a USB host connected to the USB device, wherein the control circuit comprises:
a discrimination circuit for discriminating a voltage value of the power;
a control circuit for controlling powers to be applied to the functional modules;
a memory circuit for storing a descriptor indicating a type and a characteristic of the USB device; and
a plurality of data structure analyzing units corresponding to the type of the USB device,
wherein the control circuit turns a functional module to be activated from among the functional modules, which the USB device comprises, into an ON state according to a type of the USB device corresponding to a discrimination result of the voltage value of the power by the discrimination circuit, thereby transferring the descriptor indicating the type and the characteristic of the USB device corresponding to the discrimination result to the USB host, and
wherein the data structure analyzing unit corresponding to the type and the characteristic of the USB device indicated by the descriptor analyzes data transmitted in accordance with the descriptor from the USB host and processes data to be transmitted to the USB host so that the data corresponds to the type and the characteristic of the USB device indicated by the descriptor.

2. The Universal Serial Bus (USB) device according to claim 1,
wherein the control circuit performs switching so as to apply power to the functional module to be activated.

3. The Universal Serial Bus (USB) device according to claim 1,
wherein the control circuit activates only a certain functional module in the USB device when the potential level of the power is Va and activates all the functional modules in the USB device when the potential level of the power is Vb larger than the Va.

4. A peripheral device connectable to a computer and comprising a plurality of functional modules that includes a control circuit for switching a functional module to be activated from among the functional modules comprised in the peripheral device according to a potential level of a power applied from the computer,
wherein the control circuit includes:
a discrimination circuit for discriminating a voltage value of the power;
a control circuit for controlling powers applied to the functional modules;
a memory circuit for storing a descriptor indicating a type and a characteristic of the peripheral device; and
a plurality of data structure analyzing units corresponding to the type of the peripheral device,
the control circuit turns a functional module to be activated from among the functional modules, which the peripheral device comprises, into an ON state according to a type of the peripheral device corresponding to a discrimination result of the voltage value of the power by the discrimination circuit, thereby transferring the descriptor indicating the type and the characteristic of the peripheral device corresponding to the discrimination result to the computer, and
the data structure analyzing unit corresponding to the type and the characteristic of the peripheral device indicated by the descriptor analyzes data transmitted in accordance with the descriptor from the computer and processes data to be transmitted to the computer so that the data corresponds to the type and the characteristic of the peripheral device indicated by the descriptor.

5. The peripheral device according to claim 4, wherein the control circuit performs switching so as to apply power to the functional module to be activated.

6. The peripheral device according to claim 4, wherein the control circuit activates only a certain functional module in the peripheral device when the potential level of the power is Va and activates all the functional modules in the peripheral device when the potential level of the power is Vb, which is larger than the Va.

* * * * *